(12) United States Patent
Harris

(10) Patent No.: US 7,191,560 B2
(45) Date of Patent: Mar. 20, 2007

(54) FLYING INSECT TRAP

(76) Inventor: David Harris, 1410 Fightline Dr., Lincoln, CA (US) 95648

( * ) Notice: Subject to any disclaimer, the term of this patent is extended or adjusted under 35 U.S.C. 154(b) by 43 days.

(21) Appl. No.: 11/036,506

(22) Filed: Jan. 12, 2005

(65) Prior Publication Data

US 2006/0150472 A1    Jul. 13, 2006

(51) Int. Cl.
*A01M 1/14* (2006.01)
*A01M 1/04* (2006.01)

(52) U.S. Cl. .............................. 43/114; 43/113; 43/107

(58) Field of Classification Search ................. 43/113, 43/114, 107

See application file for complete search history.

(56) References Cited

U.S. PATENT DOCUMENTS

| | | | | |
|---|---|---|---|---|
| 4,168,591 A | * | 9/1979 | Shaw ........................... | 43/114 |
| 4,212,129 A | * | 7/1980 | Shumate ..................... | 43/113 |
| 4,802,303 A | | 2/1989 | Floyd III | |
| 4,907,366 A | * | 3/1990 | Balfour ....................... | 43/114 |
| 5,027,547 A | * | 7/1991 | Livshin ......................... | 43/98 |
| 5,044,112 A | * | 9/1991 | Williams ..................... | 43/113 |
| 5,142,815 A | * | 9/1992 | Birdsong ..................... | 43/113 |
| 5,231,790 A | * | 8/1993 | Dryden et al. ............... | 43/113 |
| 5,241,779 A | * | 9/1993 | Lee ............................. | 43/113 |
| 5,301,456 A | * | 4/1994 | Jobin et al. ................... | 43/113 |
| 5,311,697 A | * | 5/1994 | Cavanaugh et al. .......... | 43/113 |
| 5,323,556 A | * | 6/1994 | Carle ........................... | 43/113 |
| 5,325,625 A | * | 7/1994 | Liu et al. ...................... | 43/114 |
| 5,417,009 A | * | 5/1995 | Butler et al. .................. | 43/113 |
| 5,628,142 A | * | 5/1997 | Kitterman et al. ............ | 43/114 |
| 5,634,292 A | * | 6/1997 | Kitterman .................... | 43/113 |
| 5,647,164 A | * | 7/1997 | Yates ........................... | 43/113 |
| 5,651,211 A | * | 7/1997 | Regan et al. ................. | 43/113 |
| 5,799,436 A | * | 9/1998 | Nolen et al. .................. | 43/112 |
| 5,928,194 A | | 7/1999 | Maget | |
| 5,938,640 A | | 8/1999 | Maget | |
| 6,134,826 A | * | 10/2000 | Mah ............................. | 43/113 |
| 6,145,243 A | * | 11/2000 | Wigton et al. ................ | 43/107 |
| 6,161,327 A | * | 12/2000 | Thomas ........................ | 43/114 |
| 6,199,316 B1 | * | 3/2001 | Coventry ...................... | 43/107 |
| 6,516,559 B1 | * | 2/2003 | Simchoni et al. ............. | 43/114 |
| 6,530,172 B2 | * | 3/2003 | Lenz ............................ | 43/112 |
| 6,560,918 B2 | * | 5/2003 | Nelson ......................... | 43/113 |
| 6,568,124 B1 | * | 5/2003 | Wilbanks ...................... | 43/113 |
| 6,594,946 B2 | * | 7/2003 | Nolen et al. .................. | 43/114 |
| 6,655,078 B2 | * | 12/2003 | Winner et al. ................ | 43/114 |
| 6,655,080 B2 | * | 12/2003 | Spiro et al. .................... | 43/113 |
| 6,662,489 B2 | * | 12/2003 | Spiro et al. .................... | 43/107 |
| 6,688,035 B1 | * | 2/2004 | Shichman ..................... | 43/113 |
| 6,836,999 B2 | * | 1/2005 | Rich et al. ..................... | 43/98 |
| 6,854,208 B1 | * | 2/2005 | Chuang et al. ............... | 43/113 |

(Continued)

FOREIGN PATENT DOCUMENTS

CN        1672509 A    *    9/2005

(Continued)

*Primary Examiner*—Darren W. Ark
(74) *Attorney, Agent, or Firm*—Temmerman Law Office; Mathew J. Temmerman

(57) ABSTRACT

A flying insect trap containing a light, a fan, and a heater is disclosed. A light controller controls the operation of the light, so that the light can turn off or blink when it is time to change the adhesive paper that traps the insects or the bait that attracts the insects.

6 Claims, 5 Drawing Sheets

U.S. PATENT DOCUMENTS

| | | |
|---|---|---|
| 6,886,292 B2 * | 5/2005 | Studer et al. .................. 43/113 |
| 6,892,492 B2 * | 5/2005 | Durand et al. ................. 43/107 |
| 2002/0056223 A1 | 5/2002 | Garretson |
| 2003/0000126 A1 | 1/2003 | Lenz |
| 2003/0041506 A1 | 3/2003 | Coventry |
| 2003/0079398 A1 * | 5/2003 | Holmes ....................... 43/113 |

FOREIGN PATENT DOCUMENTS

| | | | |
|---|---|---|---|
| JP | 8-332015 A | * | 12/1996 |
| JP | 2000-232841 A | * | 8/2000 |
| JP | 2000-253793 A | * | 9/2000 |
| JP | 2005-46018 A | * | 2/2005 |
| SU | 1748769 A1 | * | 7/1992 |
| WO | WO-2005-048703 A1 | * | 6/2005 |
| WO | WO-2005/082139 A1 | * | 9/2005 |

* cited by examiner

FLYING INSECT TRAP

BACKGROUND OF THE INVENTION

1. Field of the Invention

This invention relates to insect traps.

2. General Background

Flying insects are an annoying problem for many households. Previous methods of controlling household flying insects have generally proved ineffective. For instance, while traditional traps can catch some insects, many would remain. Since any flying insect in a household is unacceptable, there is a need for a flying-insect trap with increased ability to attract and exterminate such pests.

SUMMARY OF THE INVENTION

The present invention is a flying-insect trap comprising (i) a housing, (ii) an optional receptacle for holding insect attractant, (iii) a light with a light controller, (iv) a fan, (v) a heater, and (vi) adhesive paper. This invention has two means of attracting insects: the light and the attractant, and also has two means for improving circulation of the scent from the attractant, namely the heater and the fan.

DETAILED DESCRIPTION

Figure 1:
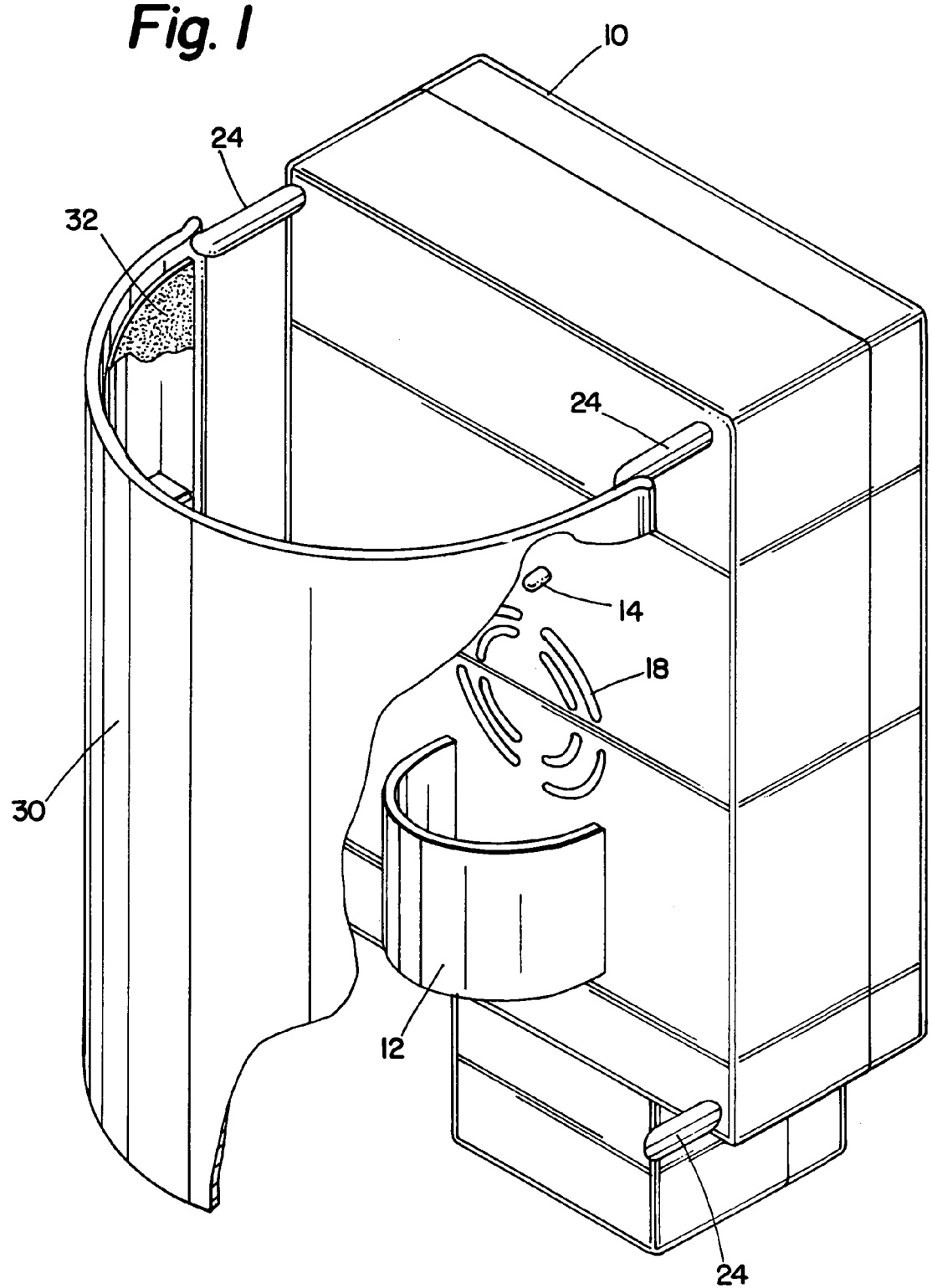
FIG. 1 is a perspective view of a flying-insect trap according to an embodiment of the present invention.

The present invention is an insect trap comprising (i) a housing 10, (ii) a receptacle 12, (iii) a light 14, (iv) a light controller 16, (v) a vent 18, (vi) a fan 20, (vii) a heater 22, (viii) cover supports 24, (ix) a cover 30, and (x) adhesive paper 32.

Figure 2:
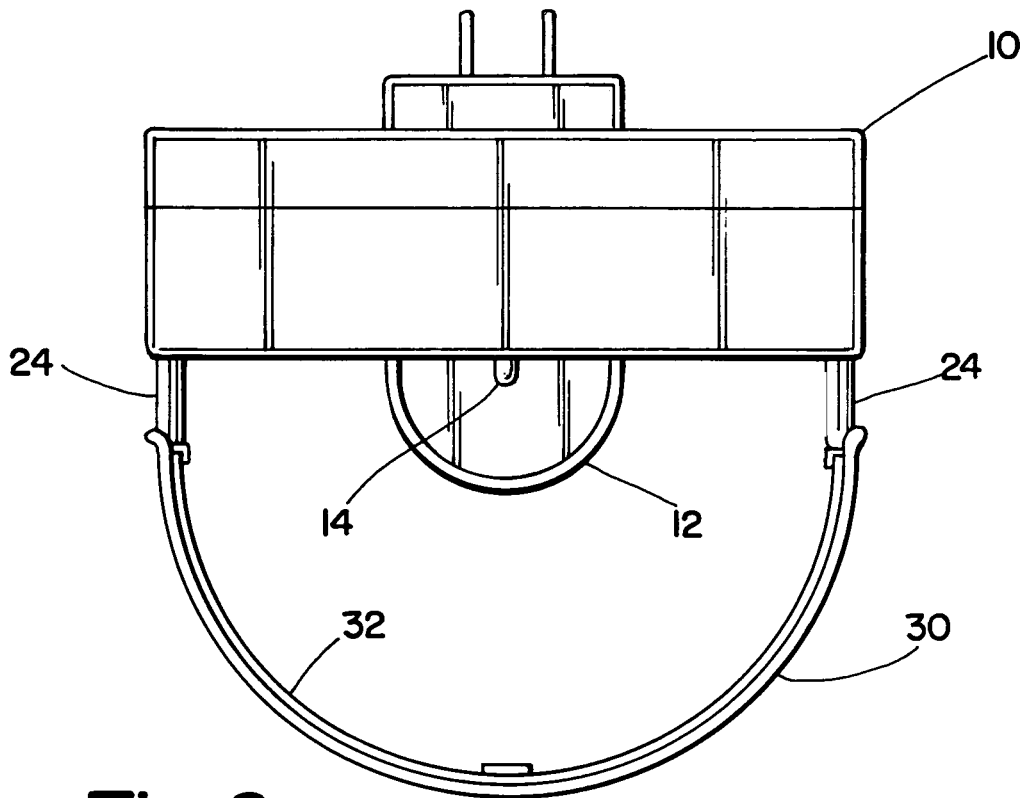
FIG. 2 is a top view of an insect trap according to an embodiment of the invention.
Figure 3:
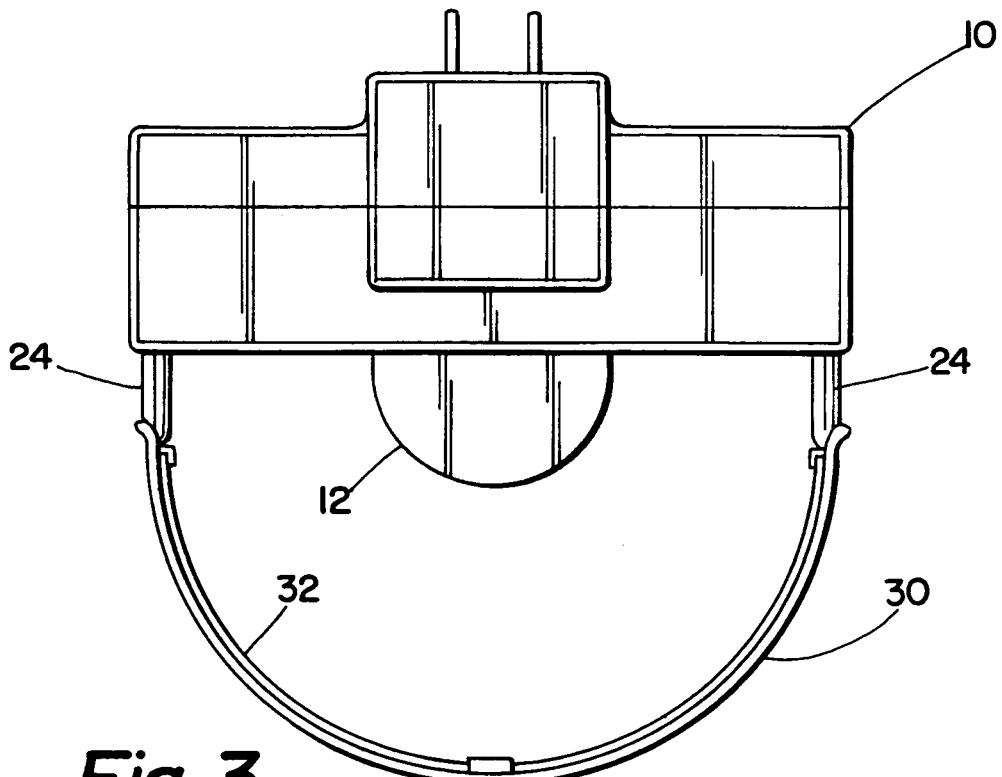
FIG. 3 is a bottom view of an insect trap according to an embodiment of the present invention.
Figure 5:
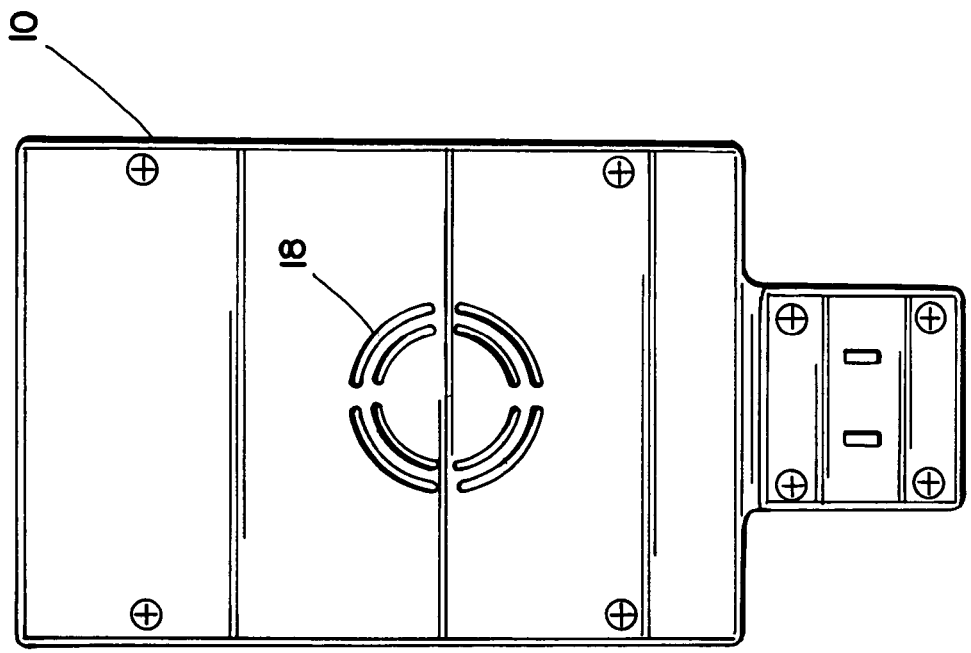
FIG. 5 is a rear view of an insect trap according to an embodiment of the present invention.
Figure 4:
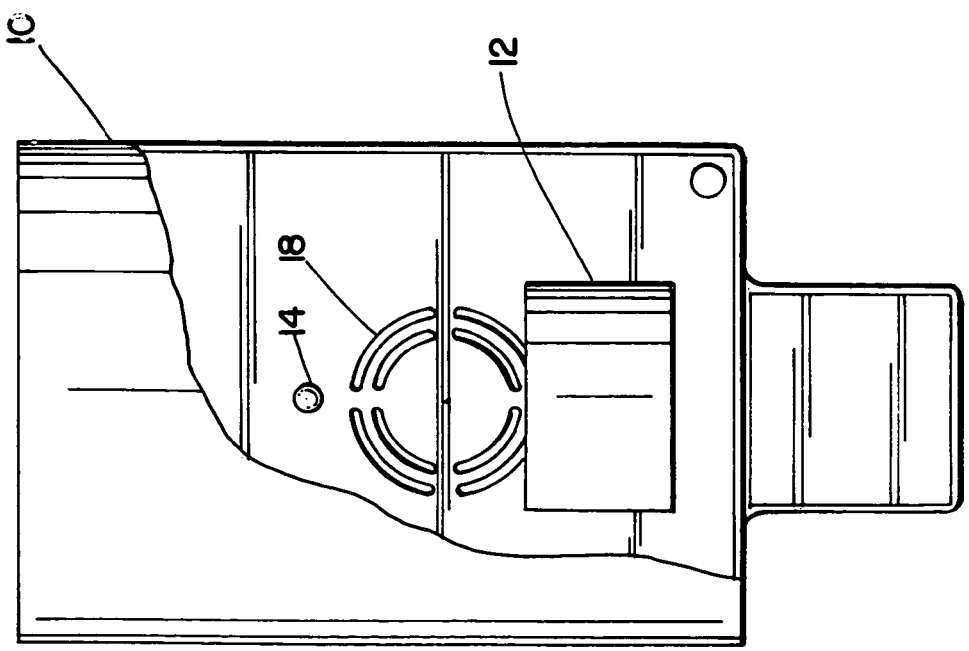
FIG. 4 is a front view of an insect trap according to an embodiment of the present invention, with a portion of the front cover removed to reveal the interior of the trap.
Figure 7:
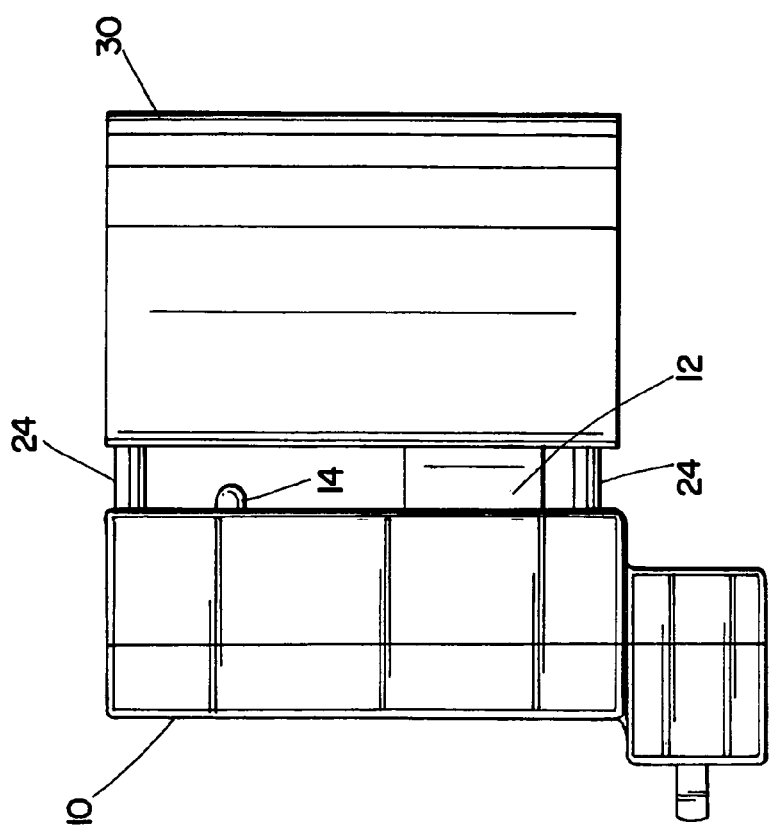
FIG. 7 is a side view, taken from the side opposite to FIG. 6, of an insect trap according to an embodiment of the present invention.
Figure 6:
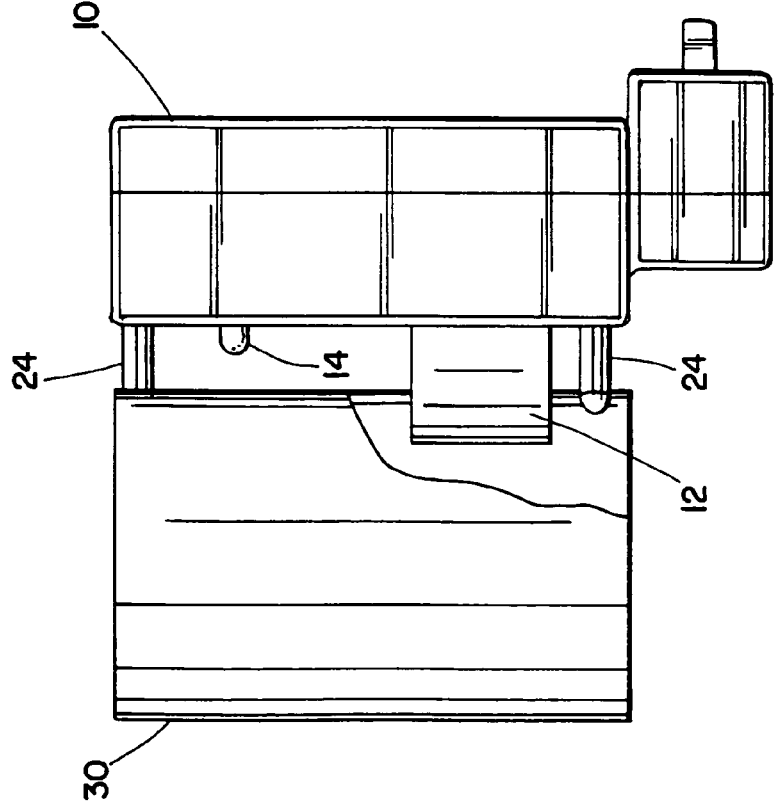
FIG. 6 is a side view of an insect trap according to an embodiment of the present invention.
Figure 8:
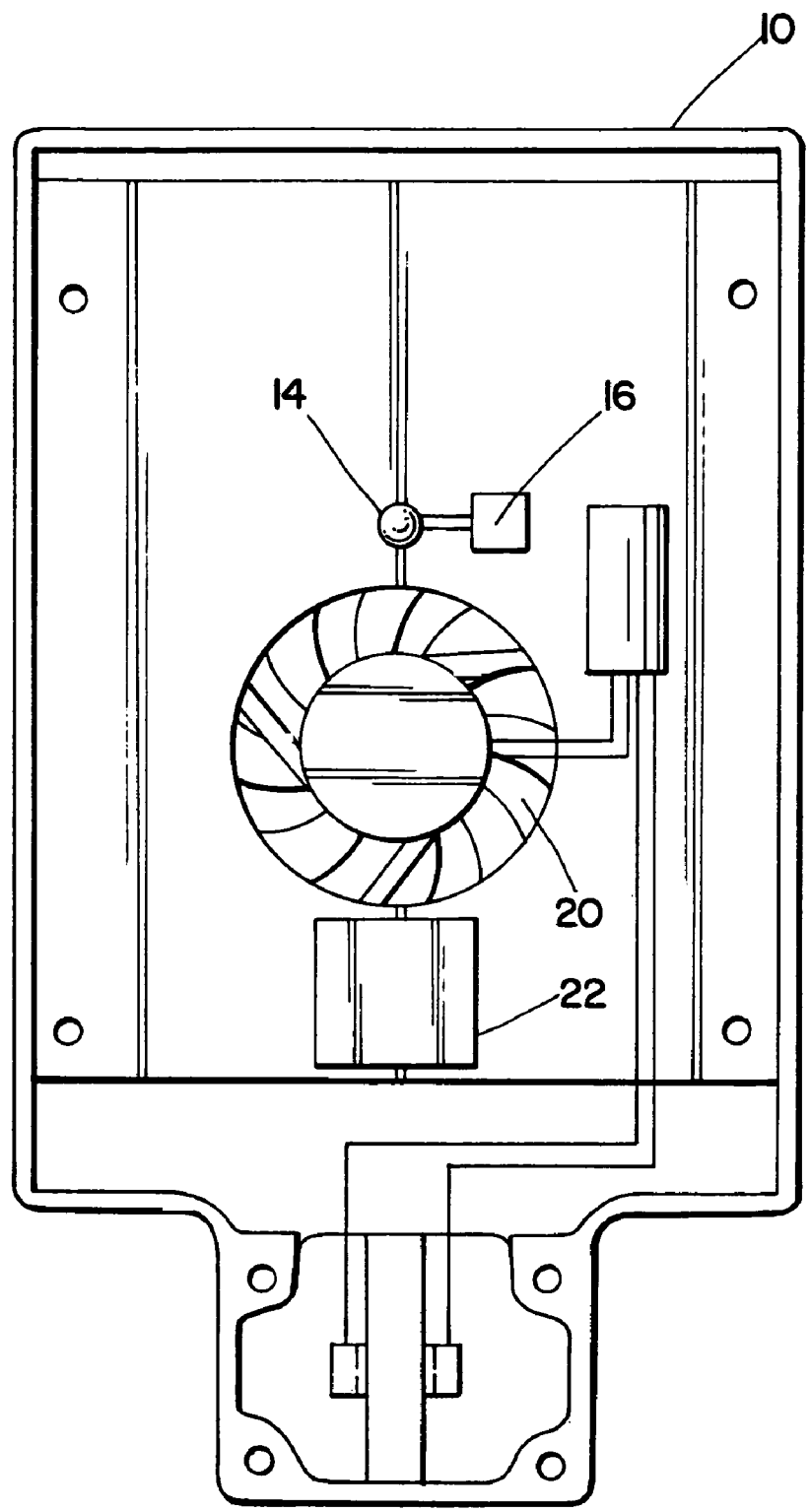
FIG. 8 is a back view of an insect trap according to an embodiment of the present invention, with the back cover removed.

The housing 10 provides a support structure for the remaining components of the present invention. The housing may be made of plastic, metal, composite materials, or any other material suitable for the purpose. See FIGS. 1–8.

An optional receptacle 12 is placed at the front side of the housing 10. This receptacle 12 may hold the bait or attractant (not shown) that attracts the flying insects. The bait or attractant may be a liquid, a powder or other solid, or any other suitable bait or attractant. Suitable baits include but are not limited to: flour pantry moth pheromone, generic baits for flies and gnats and other flying insects, and color-based baits for fruit flies, particularly yellow baits. In addition to or instead of placement on the receptacle, the bait may be placed on the adhesive paper 32.

A light 14 is also placed on the front surface of the housing 10. See FIG. 1. The light 14 may be any light source, including but not limited to an LED, an incandescent light, or other suitable lighting means. In one embodiment, the light 14 is a white LED. Other colors, including white with a blue tint, may be used.

The light 14 is controlled by a light controller 16. The light controller 16 ensures that the light 14 turns off after a certain period of illumination. For instance, the light controller 16 may be an integrated circuit or other electronic component that shuts the light 14 off after it has been illuminated for a total of 90 days.

Thus, the light controller 16 may indicate to the user that the adhesive paper 32 should be replaced. The adhesive paper 32 has a limited life, but many users of typical insect traps forget to inspect the adhesive paper and replace it when it is no longer sufficiently sticky. However, with the present invention, the user can simply look at the light 14, and if it is off, then the user will know that it is time to replace the adhesive paper 32. The light can also be used to indicate that the bait or attractant should be changed. In one embodiment, the light controller 16 would turn the light 14 off after 90 days of use.

The light controller 16 may also cause the light 14 to flash or illuminate in another pattern after a certain amount of time. This flashing light can be used to communicate other messages to the user. For instance, a flashing light could be used to tell the user that the adhesive paper 32 should be replaced within a week, while a non-illuminated light could indicate that the adhesive paper 32 is past its recommended usage period.

In lieu of the light 14 and light controller 16, other means may be used to indicate to the user that the adhesive paper 32 should be replaced. For instance, a beep or other sound could be used to indicate the need to change the adhesive paper 32, or other conventional indicator means could be used.

A vent 18 and fan 20 are provided to help circulate and evaporate the attractant or bait in the receptacle 12. See FIG. 1.

Also, a heater 22 may be provided to slightly warm the attractant and surrounding air, thereby facilitating circulation of the scent from the bait or attractant. In one embodiment, the heater would be set at a temperature of approximately 78–98 degrees Fahrenheit.

Attached to the housing 10 are cover supports 24 that help support the cover 30. See FIG. 1, FIG. 2, FIG. 3, FIG. 6, FIG. 7.

The cover 30 is used to hold the adhesive paper 32. In one embodiment, as shown best in FIG. 1, the cover may be a semi-cylindrical dome that attaches to the cover supports 24.

Inside the cover 30, adhesive paper 32 is placed. This adhesive paper 32 is used to trap the flying insects that are attracted by the light 14 and bait. Such adhesive paper typically has a limited life span of 90 to 180 days. Although the paper typically retains its "stickiness" after that period, it may be covered with dust or insect debris and therefore its usefulness may be diminished. When a particular piece of adhesive paper 32 is ready for replacement, the light 14 will indicate the need for a change in adhesive paper (by blinking or turning off) and the user can then replace the adhesive paper 32 with a fresh supply.

The present invention offers a number of advantages over the prior art. More particularly, the present invention takes an integrative approach to attracting flying insects, by using a light 14 in conjunction with a fan 20 with a heater. Also, the heater helps to create a more comfortable and therefore attractive environment for the flying insects. Finally, the light controller 16 allows the device to communicate to the user when it is time to change the adhesive or bait.

One skilled in the art will appreciate that the present invention can be practiced by other than the preferred embodiments, which are presented for purposes of illustration and not of limitation.

I claim:

1. An insect trap comprising:
   a. a housing;
   b. a receptacle on said housing;
   c. adhesive paper associated with said housing, for trapping flying insects drawn by said attractant, said adhesive paper having an anticipated useful life time period;
   d. a light associated with said housing;
   e. a light controller associated with said housing and controlling said light, wherein said light controller indicates that it is time to replace said adhesive paper, said light controller further comprising:
      a means to indicate to a user a first message that it will soon be time to replace said adhesive paper, wherein said means to indicate a first message comprises said light blinking after a first pre-determined amount of time has passed, wherein said first pre-determined amount of time is less than said anticipated useful life time period of said adhesive paper; and
      a means to indicate to a user a second message that it is time to replace said adhesive paper, wherein said means to indicate a second message comprises the non-blinking and unillumination of said light after a second pre-determined amount of time has passed, wherein said second pre-determined amount of time is no less than said anticipated useful life time period of said adhesive paper;
   f. a fan associated with said housing;
   g. attractant in said receptacle;
   h. wherein said fan circulates air inside said receptacle;
   i. a heater associated with said housing wherein said heater warms said air inside said receptacle thereby facilitating circulation of said attractant.

2. The trap according to claim 1, wherein said anticipated useful life time period of said adhesive paper is between 90 and 180 days.

3. The insect trap according to claim 1, additionally comprising a cover and cover supports, wherein said cover supports are attached to said housing, and wherein said cover is attached to said cover supports.

4. The trap according to claim 3, wherein said cover holds said adhesive paper.

5. The trap according to claim 1, wherein said light is a white LED.

6. The trap according to claim 1, wherein said light is a white LED with a blue tint.

* * * * *